United States Patent
Kolchiba

(10) Patent No.: US 12,085,249 B2
(45) Date of Patent: Sep. 10, 2024

(54) VEHICLE LAMP

(71) Applicant: KOITO MANUFACTURING CO., LTD., Tokyo (JP)

(72) Inventor: Mykyta Kolchiba, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/547,523

(22) PCT Filed: Mar. 7, 2022

(86) PCT No.: PCT/JP2022/009633
§ 371 (c)(1),
(2) Date: Aug. 23, 2023

(87) PCT Pub. No.: WO2022/191104
PCT Pub. Date: Sep. 15, 2022

(65) Prior Publication Data
US 2024/0133532 A1   Apr. 25, 2024
US 2024/0230047 A9   Jul. 11, 2024

(30) Foreign Application Priority Data
Mar. 11, 2021   (JP) .................. 2021-039234

(51) Int. Cl.
*F21S 41/00*   (2018.01)
*B60Q 1/04*   (2006.01)
(Continued)

(52) U.S. Cl.
CPC .............. *F21S 41/275* (2018.01); *B60Q 1/04* (2013.01); *F21S 41/143* (2018.01); *F21W 2102/155* (2018.01); *F21Y 2115/10* (2016.08)

(58) Field of Classification Search
CPC ........ F21S 41/275; F21S 41/143; B60Q 1/04; F21Y 2115/10; F21W 2102/155
See application file for complete search history.

(56) References Cited

U.S. PATENT DOCUMENTS

| | | | |
|---|---|---|---|
| 2008/0253141 A1* | 10/2008 | Nakada | F21S 41/151 362/507 |
| 2013/0051057 A1* | 2/2013 | Okubo | F21S 41/143 362/520 |

(Continued)

FOREIGN PATENT DOCUMENTS

| | | |
|---|---|---|
| JP | 2013-051167 A | 3/2013 |
| JP | 2015-230769 A | 12/2015 |

(Continued)

OTHER PUBLICATIONS

International Search Report dated Apr. 5, 2022 filed in PCT/JP2022/009633.

*Primary Examiner* — Gerald J Sufleta, II
(74) *Attorney, Agent, or Firm* — Pearne & Gordon LLP

(57) ABSTRACT

A vehicle lamp is configured in such a manner as to project light from light-emitting elements (22 and 42) of a first and a second lamp unit (20 and 40) forward through lenses (30 and 50) in the lamp and accordingly form a low-beam light distribution pattern having a Z-shaped cut-off line. In addition, a part of a plurality of lens elements formed on a front surface (30a, 50a) of each of the lenses (30 and 50) is formed as a specific lens element (30aA3, 50sB3) having a freeform surface shape. It is configured in such a manner as to form an inclined portion of the Z-shaped cut-off line with light emitted from the specific lens elements (30sA3 and 50sB3). Consequently, the degree of flexibility in forming the Z-shaped cut-off line is increased.

4 Claims, 12 Drawing Sheets

(51) Int. Cl.
*F21S 41/143* (2018.01)
*F21S 41/275* (2018.01)
*F21W 102/155* (2018.01)
*F21Y 115/10* (2016.01)

(56) References Cited

U.S. PATENT DOCUMENTS

2017/0146209 A1* 5/2017 Okubo ................ F21S 41/321
2022/0178511 A1* 6/2022 Matsumoto ........... F21S 41/285

FOREIGN PATENT DOCUMENTS

| JP | 2020-170586 A | 10/2020 |
| WO | 2020203641 A1 | 10/2020 |

* cited by examiner

VEHICLE LAMP

TECHNICAL FIELD

The invention of the present application relates to a vehicle lamp configured to project light from a light-emitting element, forward through a lens in the lamp.

BACKGROUND ART

Conventionally, as the configuration of a vehicle lamp, a configuration in which light from a light-emitting element is projected forward through a lens in the lamp is known.

"Patent Literature 1" describes, as such a vehicle lamp, a vehicle lamp configured to let in light emitted from a light-emitting element whose light-emitting surface faces forward in the lamp, from a total reflection control portion formed on the back surface of a lens, then totally reflect the light forward in the lamp, then control emission of the totally reflected light in a plurality of lens elements formed on the front surface of the lens, and accordingly form a light distribution pattern having a cut-off line.

CITATION LIST

Patent Literature

Patent Literature 1: JP-A-2020-170586

SUMMARY OF INVENTION

Problems to be Solved by Invention

In the vehicle lamp described in "Patent Literature 1" above, the plurality of lens elements formed on the front surface of the lens is formed in a cylindrical lens shape; therefore, it is possible to form a straight cut-off line, but it is not easy to form the cut-off line in other shapes.

The invention of the present application has been made in view of such circumstances, and an object thereof is to provide a vehicle lamp configured to project light from a light-emitting element forward through a lens in the lamp and accordingly form a light distribution pattern having a cut-off line, in which the degree of flexibility in forming the cut-off line can be increased.

Solution to Problems

The invention of the present application aims to achieve the above object by devising the configuration of a plurality of lens elements.

In other words, a vehicle lamp according to the invention of the present application includes: a light-emitting element; and a lens, the vehicle lamp being configured to project light from the light-emitting element forward through the lens in the lamp and accordingly form a light distribution pattern having a cut-off line, in which the light-emitting element is placed with a light-emitting surface thereof facing forward in the lamp, on a back surface of the lens, a total reflection control portion is formed to let in the light emitted from the light-emitting element and then totally reflect the light forward in the lamp, on a front surface of the lens, a plurality of lens elements is formed to control emission of the light reaching from the total reflection control portion, at least a part of the plurality of lens elements is formed as a specific lens element having a freeform surface shape, and the lens is configured to form a part of the cut-off line with light emitted from the specific lens element.

The above "light-emitting element" is simply required to be placed with the light-emitting surface facing forward in the lamp, and is not necessarily placed with the light-emitting surface facing in a direction toward the front of the lamp.

The above "total reflection control portion" is simply required to be configured to let in the light emitted from the light-emitting element and then totally reflect the light forward in the lamp, and a specific configuration thereof is not particularly limited.

The "specific lens element" is simply required to have a freeform surface shape, and a specific surface shape thereof is not particularly limited, and the specific placement and outer shape thereof are not particularly limited, either.

Effects of Invention

A vehicle lamp according to the invention of the present application is configured to let in light emitted from a light-emitting element whose light-emitting surface faces forward in the lamp, from a total reflection control portion formed on a back surface of a lens, then totally reflect the light forward in the lamp, then control emission of the totally reflected light in a plurality of lens elements formed on a front surface of the lens, and accordingly form a light distribution pattern having a cut-off line. However, it is configured in such a manner that at least a part of the plurality of lens elements is formed as a specific lens element having a freeform surface shape, and that light emitted from the specific lens element forms a part of the cut-off line. Therefore, the degree of flexibility in forming the cut-off lens can be increased.

As described above, according to the invention of the present application, the degree of flexibility in forming the cut-off line can be increased in the vehicle lamp configured to project the light from the light-emitting element forward through the lens in the lamp and accordingly form the light distribution pattern having the cut-off line.

Moreover, with the adoption of the configuration of the invention of the present application, it is also possible to, in a case where, as the light distribution pattern, a low-beam light distribution pattern including a Z-shaped cut-off line in which a lower cut-off line and an upper cut-off line extending in a horizontal direction at different heights on left and right sides are connected via an inclined portion is formed, easily form the inclined portion of the Z-shaped cut-off line with the light emitted from the specific lens element.

At this point in time, if the configuration of the lens includes a configuration in which the light emitted from the specific lens element forms a part of the upper cut-off line, together with the inclined portion of the Z-shaped cut-off line, it is possible to form the Z-shaped cut-off line in which the inclined portion and the upper cut-off line are smoothly connected together.

Furthermore, if the light-emitting element includes a configuration in which the light-emitting element is placed in such a manner that a lower edge of the light-emitting surface of the light-emitting element is aligned with the center of the lens, and the specific lens element includes a configuration in which the specific lens element has a vertically long outer shape that spreads downward in a fan form in a lower region of the lens, a light distribution pattern formed by the light emitted from the specific lens element can be clearly formed in a shape suitable to form the inclined portion (and a part of the upper cut-off line) of the Z-shaped cut-off line.

The above configurations further include a configuration of the lens in which light emitted from a lens element located in an outer peripheral edge region of the lens among the plurality of lens elements forms the upper cut-off line and/or the lower cut-off line of the Z-shaped cut-off line, the following operations and effects can be obtained.

In other words, in the lens, the light that is let in from an outer peripheral edge region of the back surface of the lens is emitted from the outer peripheral edge region of the front surface of the lens. However, the light-emitting surface of the light-emitting element faces forward in the lamp. Therefore, the viewing angle of the light-emitting surface from the back surface of the lens is small in the outer peripheral edge region of the lens. Hence, the light distribution pattern formed by the light emitted from the lens element located in the outer peripheral edge region of the front surface of the lens is small and bright. Therefore, if the upper cut-off line and/or the lower cut-off line are formed by this light distribution pattern, they can be formed more clearly.

At this point in time, the lens element located in the outer peripheral edge region of the lens may or may not be formed as the specific lens element (that is, a lens element having a freeform surface shape).

DESCRIPTION OF EMBODIMENTS

An embodiment of the invention of the present application is described hereinafter with reference to the drawings.

Figure 1:
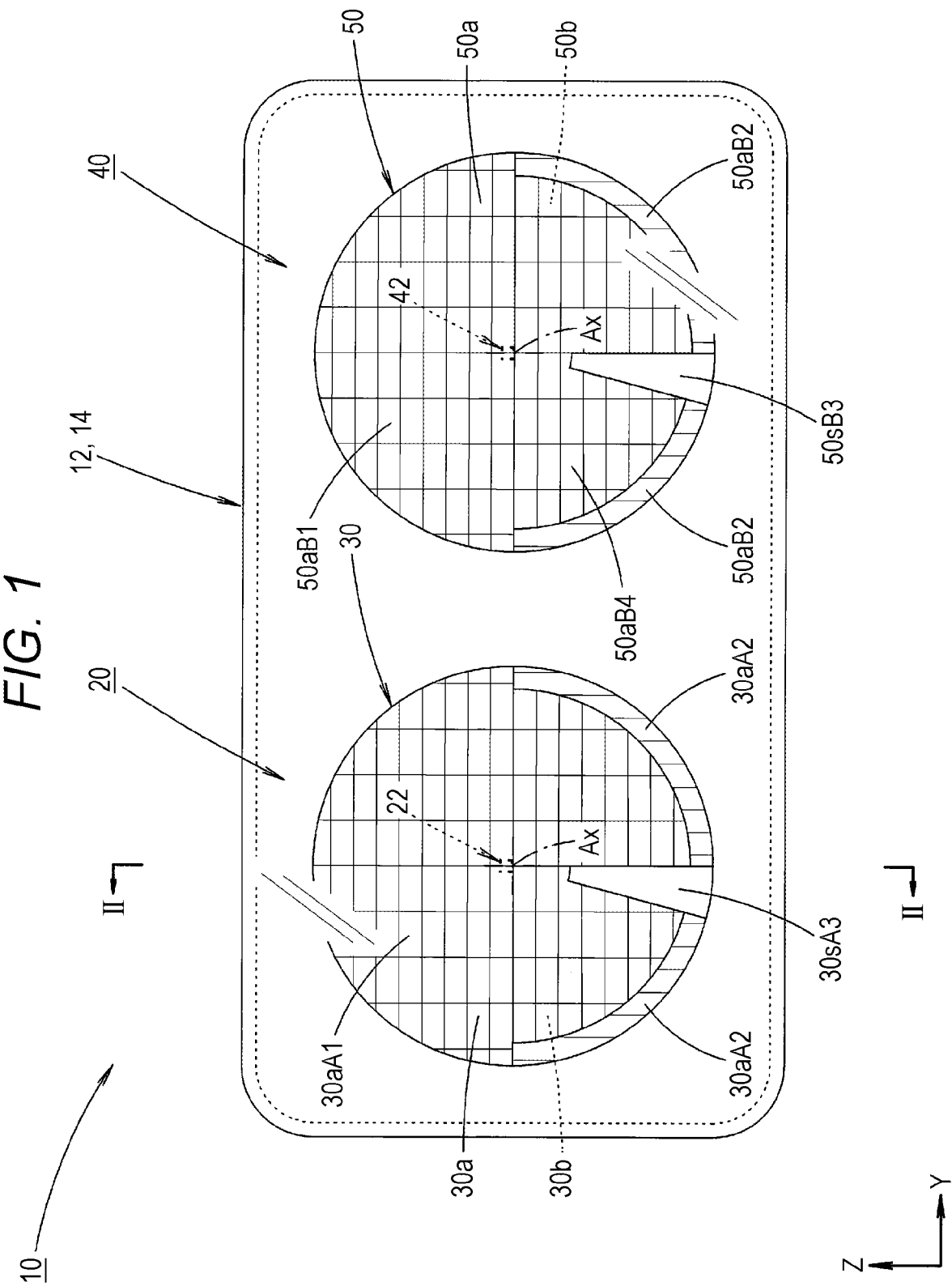
FIG. 1 is a front view illustrating a vehicle lamp according to one embodiment of the invention of the present application.

FIG. 1 is a front view illustrating a vehicle lamp 10 according to the embodiment. Moreover, FIG. 2 is a cross-sectional view taken along line II-II of FIG. 1.

In these drawings, a direction represented by X is "forward in a vehicle" and "forward in the lamp", a direction represented by Y is "left" ("right" in front view of the lamp) orthogonal to "forward in the lamp," and a direction represented by Z is "up".

Figure 2:
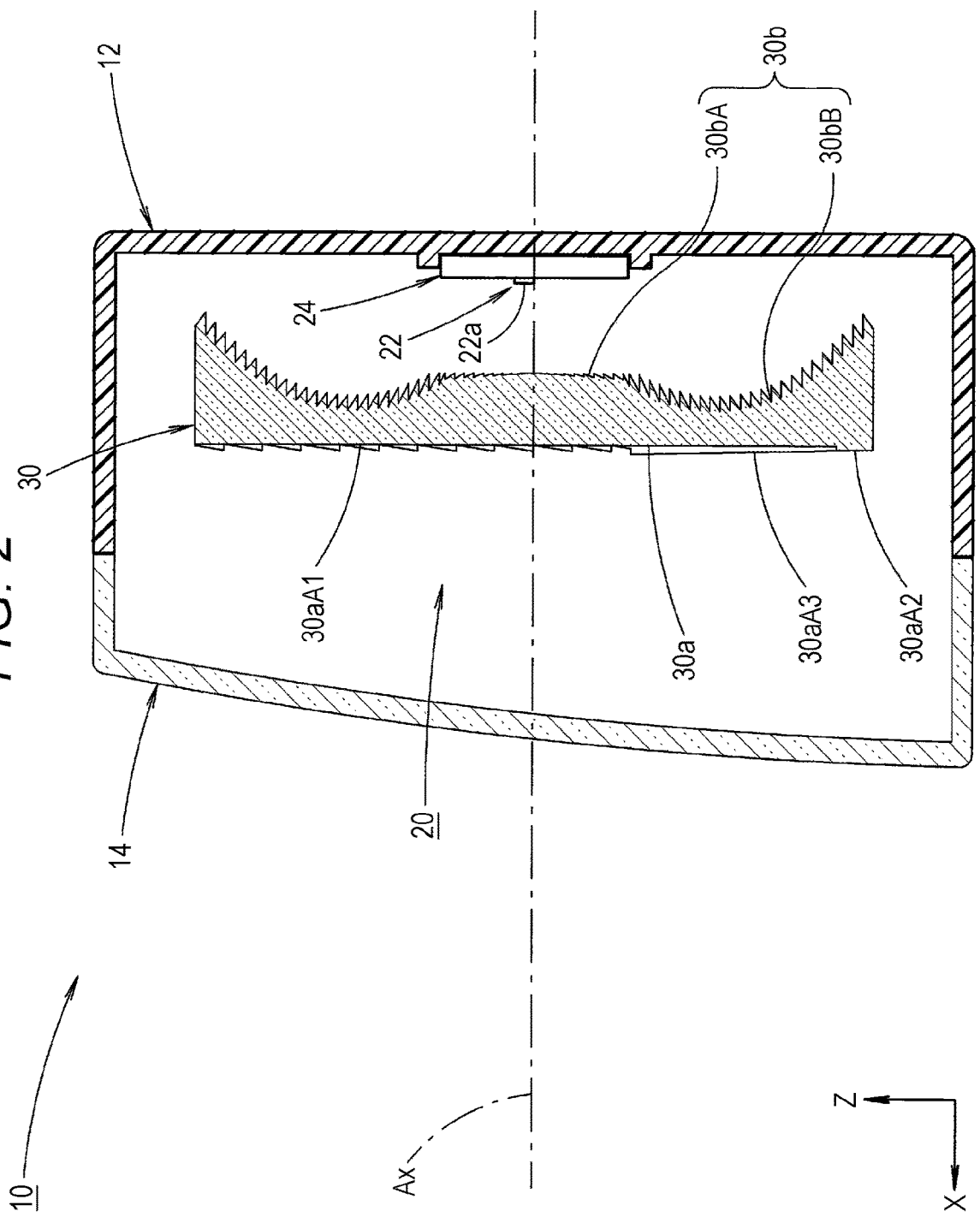
FIG. 2 is a cross-sectional view taken along line II-II of FIG. 1.

As illustrated in FIGS. 1 and 2, the vehicle lamp 10 according to the embodiment is a headlamp placed at the front end of the vehicle, and is configured in such a manner that a first lamp unit 20 and a second lamp unit 40 are incorporated in a light chamber formed by a lamp body 12 and a clear translucent cover 14 mounted on an opening portion of the front end of the lamp body 12, with the first and second lamp units 20 and 40 aligned in a vehicle width direction.

The first lamp unit 20 includes a light-emitting element 22 and a lens 30 placed forward of the light-emitting element 22 in the lamp, and is configured in such a manner as to project light from the light-emitting element 22, forward through the lens 30 in the lamp.

The second lamp unit 40 includes a light-emitting element 42 and a lens 50 placed forward of the light-emitting element 42 in the lamp, and is configured in such a manner as to project light from the light-emitting element 42, forward through the lens 50 in the lamp.

The light-emitting elements 22 and 42 of the first and second lamp units 20 and 40 are supported by the lamp body 12 via a common board 24. Moreover, the lenses 30 and 50 of the first and second lamp units 20 and 40 are supported by the lamp body 12 via an unillustrated mounting structure.

The vehicle lamp 10 is configured in such a manner as to form a low-beam light distribution pattern (which is described below) with light projected from the first and second lamp units 20 and 40.

Next, a specific configuration of each of the first and second lamp units 20 and 40 is described.

Firstly, the configuration of the first lamp unit 20 is described.

Figure 3:
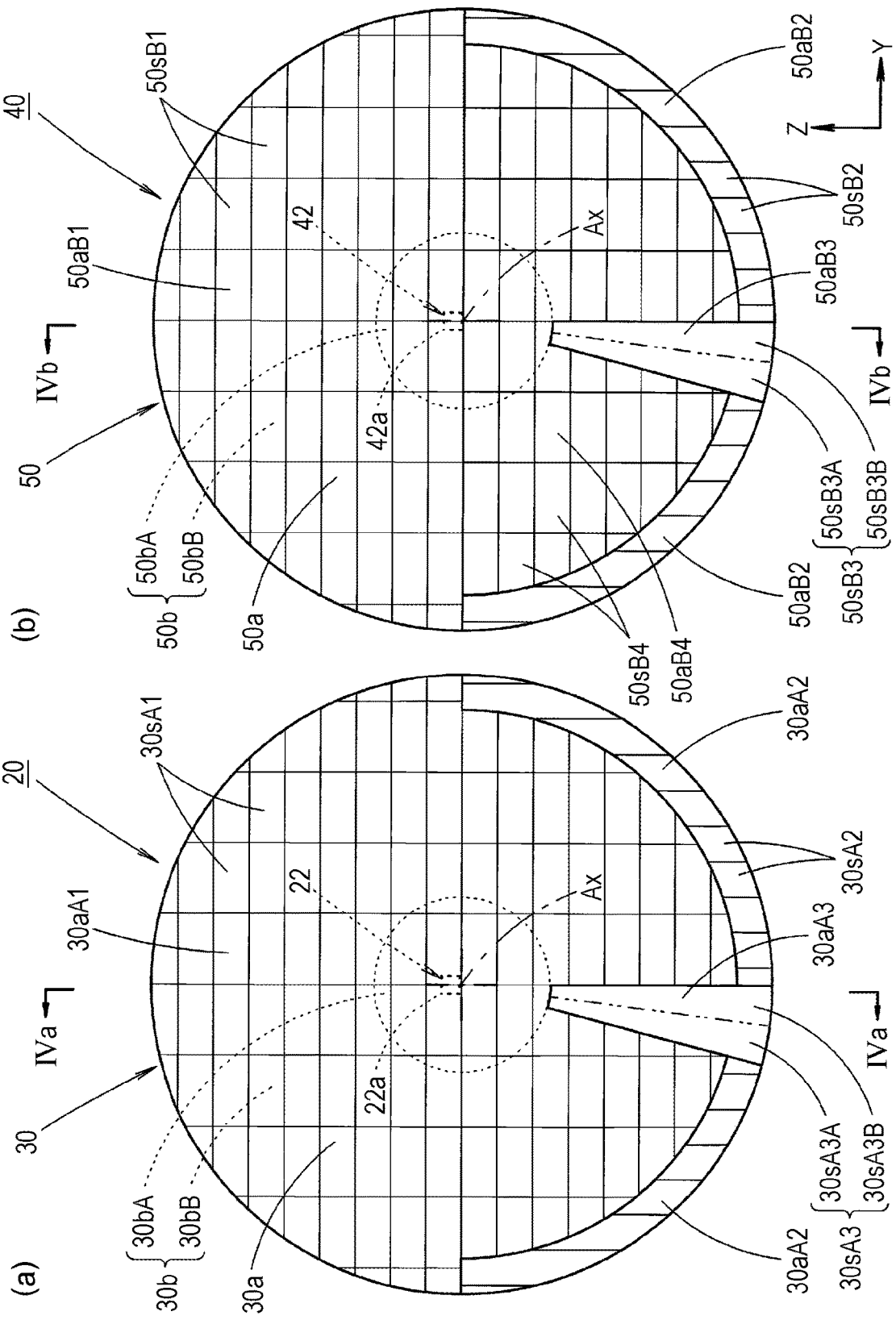
FIG. 3(a) is a front view illustrating a first lamp unit of the vehicle lamp.
FIG. 3(b) is a front view illustrating a second lamp unit of the vehicle lamp.
Figure 4:
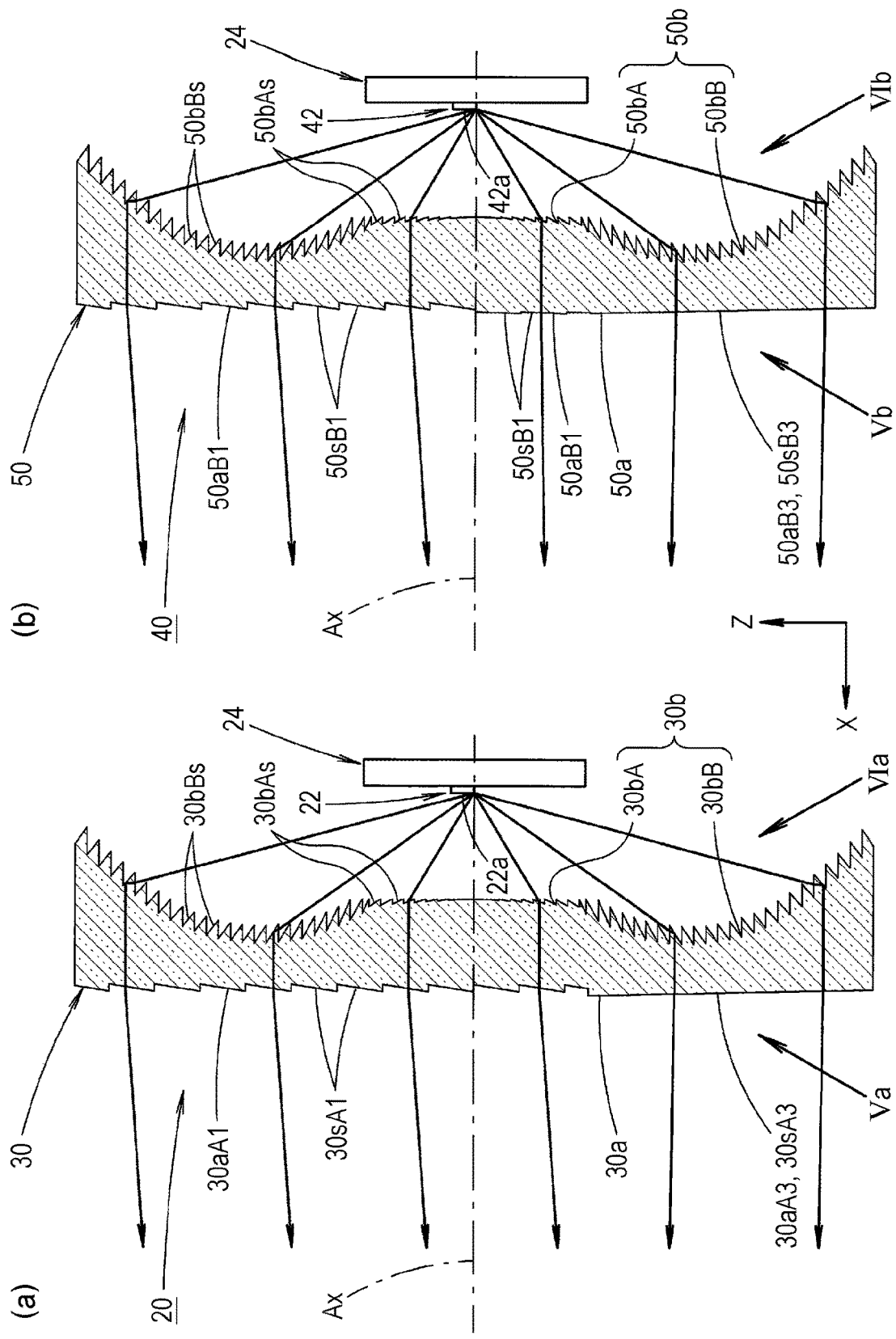
FIG. 4(a) is a cross-sectional view taken along line IVa-IVa of FIG. 3(a)
FIG. 4(b) is a cross-sectional view taken along line IVb-IVb of FIG. 3(b)

FIG. 3(a) is a front view illustrating the first lamp unit 20, and FIG. 4(a) is a cross-sectional view taken along line IVa-IVa of FIG. 3(a). Moreover, FIG. 5(a) is a perspective view illustrating the lens 30 of the first lamp unit 20 as viewed in a direction of arrow Va of FIG. 4(a), and FIG. 6(a) is a perspective view illustrating the lens 30 as viewed in a direction of arrow VIa of FIG. 4(a).

As illustrated in these drawings, the lens 30 of the first lamp unit 20 has an optical axis Ax extending in a front-and-back direction of the lamp, and has a circular outer shape centered around the optical axis Ax in front view of the lamp. The outer dimension of the lens 30 is set at a value of 50 mm or less (for example, approximately 35 mm).

The light-emitting element 22 is a white light-emitting diode, and is placed with a light-emitting surface 22a thereof facing forward in the lamp (specifically, in a direction toward the front of the lamp). The light-emitting surface 22a of the light-emitting element 22 has a rectangular outer shape (specifically, a square of approximately 1×1 mm). The light-emitting element 22 is placed such that the middle position in the left-and-right direction of the lower edge of the light-emitting surface 22a is on the optical axis Ax of the lens 30.

On a back surface 30b of the lens 30, a central region located near the optical axis Ax is formed as a refraction control portion 30bA, and a peripheral region of the central region is formed as a total reflection control portion 30bB.

A boundary position between the refraction control portion 30bA and the total reflection control portion 30bB is defined by a circle having a radius of 4 to 6 mm (for example, a radius of approximately 5 mm) centered around the optical axis Ax.

The refraction control portion 30bA is configured in such a manner as to cause light emitted from the light-emitting element 22 to be incident on the lens 30 in a mode of refracting the light in a direction closer to the optical axis Ax. Specifically, the refraction control portion 30bA includes a Fresnel lens in which a plurality of lens elements 30bAs is concentrically placed around the optical axis Ax. Each of the lens elements 30bAs is configured in such a manner as to guide the light emitted from the light-emitting element 22 to a front surface 30a of the lens 30 as parallel light travelling in the direction toward the front of the lamp.

On the other hand, the total reflection control portion 30bB is configured in such a manner as to refract the light emitted from the light-emitting element 22 in a direction away from the optical axis Ax and then totally reflect the light forward in the lamp. Specifically, the total reflection control portion 30bB includes a Fresnel lens-type total reflection prism in which a plurality of total reflection prism elements 30bBs is concentrically placed around the optical axis Ax. Each of the total reflection prism elements 30bBs is configured in such a manner as to guide the light emitted from the light-emitting element 22 to the front surface 30a of the lens 30 as parallel light travelling in the direction toward the front of the lamp.

The plurality of lens elements 30bAs forming the refraction control portion 30bA is placed along a vertical plane orthogonal to the optical axis Ax.

On the other hand, the plurality of total reflection prism elements 30bBs forming the total reflection control portion 30bB is placed along an approximately semi-doughnut-shaped concave surface centered around the optical axis Ax. In other words, the total reflection prism elements 30bBs located on the inner peripheral edge of the total reflection control portion 30bB are formed at substantially the same position as the refraction control portion 30bA in the front-and-back direction of the lamp. However, the total reflection prism elements 30bBs located on the outer peripheral side are formed in such a manner as to be located forward of the refraction control portion 30bA in the lamp, and the total reflection prism elements 30bBs located on the outer peripheral edge of the total reflection control portion 30bB are formed in such a manner as to be located backward of the refraction control portion 30bA in the lamp.

At this point in time, the distance in the front-and-back direction of the lamp from the light-emitting surface 22a of the light-emitting element 22 to the total reflection prism element 30bBs located at the outer peripheral edge of the total reflection control portion 30bB is set at a value that is half or less of the distance in the front-and-back direction of the lamp from the light-emitting surface 22a of the light-emitting element 22 to the refraction control portion 30bA. Specifically, the latter is set at a value of approximately 4 to 6 mm, and the former is set at a value of approximately 1 to 2 mm. As a result, the lens 30 is configured in such a manner as to be capable of letting in substantially the entire amount of the light emitted from the light-emitting element 22, from the back surface 30b of the lens 30.

The front surface 30a of the lens 30 is configured in such a manner that a plurality of lens elements (which is described below) is formed on a flat surface extending along a vertical plane orthogonal to the optical axis Ax.

The front surface 30a of the lens 30 is divided into three output regions 30aA1, 30aA2, and 30aA3.

The output region 30aA2 is a semi-circular arc-shaped region extending in the form of a band along the outer peripheral edge in the lower part of the front surface 30a. The output region 30aA3 is a region having a vertically long outer shape that spreads downward in a fan form in the lower region of the front surface 30a. The output region 30aA1 is the remaining region.

The output region 30aA1 is configured in such a manner as to be divided into vertical and horizontal lattice-shaped regions that are horizontally long (for example, approximately 2×4 mm), and allocate lens elements 30sA1 having a convex surface to the regions, respectively. Each of the lens elements 30sA1 is configured in such a manner as to emit the light from the light-emitting element 22 that reaches as parallel light from the back surface 30b of the lens 30, forward in the lamp, in a mode of deflecting the light downward and then diffusing the light widely in the left-and-right direction.

The output region 30aA2 is configured in such a manner as to be divided into vertical striped regions (for example, approximately 2 mm wide), and allocate lens elements 30sA2 having a convex surface to the regions, respectively. Each of the lens elements 30sA2 is configured in such a manner as to emit the light from the light-emitting element 22 that reaches as parallel light from the back surface 30b of the lens 30, forward in the lamp, in a mode of deflecting the light slightly downward and then diffusing the light widely to the right.

The output region 30aA3 is configured in such a manner that the left edge (the right edge in front view of the lamp) thereof is a straight line extending in a downward direction, directly from the optical axis Ax, and the right edge thereof is a straight line extending in a direction inclined to the right relative to the downward direction directly from the optical axis Ax (specifically, a direction inclined approximately 150 to the right from the directly downward direction). The upper edge of the output region 30aA3 is formed in an arc shape centered around the optical axis Ax. The radius of the arc is set at substantially the same value as the radius of the circle defining the boundary between the refraction control portion 30bA and the total reflection control portion 30bB on the back surface 30b of the lens 30. Moreover, the lower edge of the output region 30aA3 is formed by the outer peripheral edge of the front surface 30a.

The output region 30aA3 includes a single specific lens element 30sA3. The specific lens element 30sA3 is formed as a lens element having a freeform surface shape having a convex surface. Specifically, the surface of the specific lens element 30sA3 is formed as a freeform surface in which the curvature of the convex surface changes gradually from a right half part 30sA3A to a left half part 30sA3B. As a result, the specific lens element 30sA3 is configured in such a manner as to emit the light from the light-emitting element 22 that reaches as parallel light from the back surface 30b of the lens 30, forward in the lamp, in a mode of deflecting the light slightly upward and then gradually changing the output direction from the right half part 30sA3A to the left half part 30sA3B.

Note that the lower end of the output region 30aA3 extends to the outer peripheral edge of the front surface 30a and therefore the output region 30aA2 is partitioned into two, a left region and a right region.

Next, the configuration of the second lamp unit 40 is described.

FIG. 3(b) is a front view illustrating the second lamp unit 40, and FIG. 4(b) is a cross-sectional view taken along line IVb-IVb of FIG. 3(b). Moreover, FIG. 5(b) is a perspective view illustrating the lens 50 of the second lamp unit 40 as viewed in a direction of arrow Vb of FIG. 4(b), and FIG. 6(b) is a perspective view illustrating the lens 50 as viewed in a direction of arrow VIb of FIG. 4(b).

As illustrated in these drawings, also in the second lamp unit 40, the configuration and placement of the light-emitting element 42 are similar to those of the light-emitting element 22 of the first lamp unit 20. Also, and the basic configuration and placement of the lens 50 are similar to those of the lens 30 of the first lamp unit 20. However, the configuration of a front surface 50a of the lens 50 is partly different from that of the lens 30.

In other words, on a back surface 50b of the lens 50, a central region located near the optical axis Ax is formed as a refraction control portion 50bA, and a peripheral region of the central region is formed as a total reflection control portion 50bB. The refraction control portion 50bA includes a plurality of lens elements 50bAs. The total reflection control portion 50bB includes a plurality of total reflection prism elements 50bBs. Functions thereof are similar to those of the lens 30.

On the other hand, the front surface 50a of the lens 50 is divided into four output regions 50aB1, 50aB2, 50aB3, and 50aB4.

The output region 50aB1 has the same outer shape as the upper part of the output region 30aA1 of the lens 30. The output region 50aB2 has the same outer shape as the output region 30aA2 of the lens 30. The output region 50aB3 has the same outer shape as the output region 30aA3 of the lens 30. The output region 50aB4 has the same outer shape as the lower part of the output region 30aA1 of the lens 30.

As in the output region 30aA1 of the lens 30, the output region 50aB1 is configured in such a manner as to be divided into vertical and horizontal lattice-shaped regions that are horizontally long, and allocate lens elements 50sB1 having a convex surface to the regions, respectively. Each of the lens elements 50sB1 is configured in such a manner as to emit the light from the light-emitting element 42 that reaches as parallel light from the back surface 50b of the lens 50, forward in the lamp, in a mode of deflecting the light downward and then diffusing the light widely in the left-and-right direction.

As in the output region 30aA2 of the lens 30, the output region 50aB2 is configured in such a manner as to be divided into vertical striped regions, and allocate lens elements 50sB2 having a convex surface to the regions, respectively. However, each of the lens elements 50sB2 is configured in such a manner as to emit the light from the light-emitting element 42 that reaches as parallel light from the back surface 50b of the lens 50, forward in the lamp, in a mode of deflecting the light slightly upward and then diffusing the light widely to the left.

As in the output region 30aA3 of the lens 30, the output region 50aB3 includes a single specific lens element 50sB3. The surface shape of the specific lens element 50sB3 is similar to the surface shape of the specific lens element 30sA3 of the lens 30, and includes a freeform surface in which the curvature of the convex surface changes from a right half part 50sB3A to a left half part 50sB3B.

As in the output region 50aB1, the output region 50aB4 is configured in such a manner as to be divided into vertical and horizontal lattice-shaped regions that are horizontally long, and allocate lens elements 50sB4 having a convex surface to the regions, respectively. However, each of the lens elements 50sB4 is configured in such a manner as to emit the light from the light-emitting element 42 that reaches as parallel light from the back surface 50b of the lens 50, forward in the lamp, in a mode of deflecting the light slightly downward and then diffusing the light widely to the left.

Figure 7:
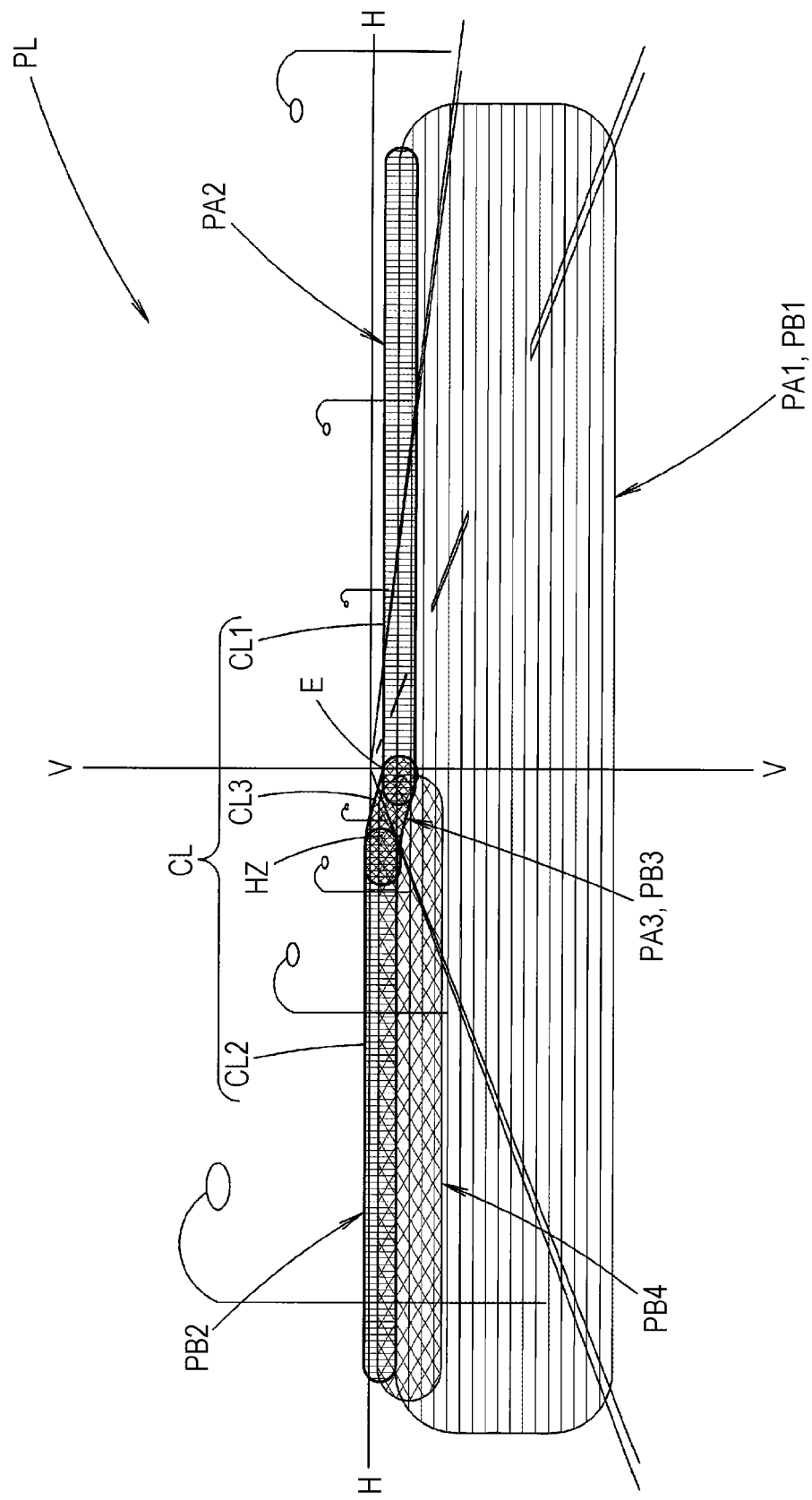
FIG. 7 is a diagram perspectively illustrating a low-beam light distribution pattern formed by light projected from the vehicle lamp.

FIG. 7 is a diagram perspectively illustrating a low-beam light distribution pattern PL that is formed by light projected from the vehicle lamp 10 on a virtual vertical screen placed at a position 25 m ahead of the lamp.

The low-beam light distribution pattern PL is a low-beam light distribution pattern of left light distribution, and a Z-shaped cut-off line CL is formed at the upper end of the low-beam light distribution pattern PL.

The Z-shaped cut-off line CL has a shape in which a lower cut-off line CL1 and an upper cut-off line CL2, which extend in the horizontal direction at different heights on the right and left sides, are connected via an inclined portion CL3. At this point in time, the Z-shaped cut-off line CL is formed in such a manner that relative to line V-V being a vertical line passing through H-V, which is the vanishing point in the direction toward the front of the lamp, the lower cut-off line CL1 is located on an opposite lane side, and the inclined portion CL3 and the upper cut-off line CL2 are located on the own driving lane side. The upper cut-off line CL2 is located slightly above line H-H, which is a horizontal line passing through H-V In the low-beam light distribution pattern PL, an elbow point E, which is an intersection point between the lower cut-off line CL1 and the inclined portion CL3, is located approximately 0.5 to 0.6° below H-V, and the inclined portion CL3 extends diagonally upward to the left from the elbow point E at an inclination angle of 15° relative to the horizontal direction. In the low-beam light distribution pattern PL, a high luminous intensity region HZ is formed near the left side of the elbow point E.

The low-beam light distribution pattern PL is formed as a combined light distribution pattern in which three light distribution patterns PA1, PA2, PA3 formed by light projected from the first lamp unit 20 and four light distribution patterns PB1, PB2, PB3, and PB4 formed by light projected from the second lamp unit 40 are superimposed.

The light distribution pattern PA1 is a light distribution pattern formed by light emitted from the output region 30aA1 on the front surface 30a of the lens 30, and is formed as a horizontally long light distribution pattern that spreads widely in the left-and-right direction with a relatively large vertical width below line H-H. The light distribution pattern PA1 forms a wide diffusion region of the low-beam light distribution pattern PL.

The light distribution pattern PA2 is a light distribution pattern formed by light emitted from the output region 30aA2 on the front surface 30a of the lens 30, and is formed as a horizontally long, bright light distribution pattern that spreads from the vicinity of line V-V to the right with a narrow vertical width in the vicinity below line H-H. The upper edge of the light distribution pattern PA2 forms the lower cut-off line CL1 of the low-beam light distribution pattern PL.

Such a light distribution pattern PA2 is formed because the viewing angle of the light-emitting surface 22a of the light-emitting element 22 from the outer peripheral edge of the total reflection control portion 30bB is extremely small and therefore the light distribution pattern formed by the light emitted from the output region 30aA2 located forward of the outer peripheral edge of the total reflection control portion 30bB in the lamp is likely to be small and bright.

The light distribution pattern PA3 is a light distribution pattern formed by light emitted from the output region 30aA3 on the front surface 30a of the lens 30, and is formed as a small, bright light distribution pattern that extends diagonally upward to the left with a narrow vertical width in the vicinity below line H-V The upper edge of the light distribution pattern PA3 forms the inclined portion CL3 of the low-beam light distribution pattern PL and the right end of the upper cut-off line CL2.

The high luminous intensity region HZ of the low-beam light distribution pattern PL is formed mainly by the light distribution pattern PA3.

The light distribution pattern PB1 is a light distribution pattern formed by light emitted from the output region 50aB1 on the front surface 50a of the lens 50, and is formed as a horizontally long light distribution pattern that spreads widely in the left-and-right direction with a relatively large vertical width below line H-H although the level of brightness is lower than that of the light distribution pattern PAL. The light distribution pattern PB1 is formed, overlapping with the light distribution pattern PA1; therefore, the brightness of the wide diffusion region of the low-beam light distribution pattern PL is secured.

The light distribution pattern PB2 is a light distribution pattern formed by light emitted from the output region 50aB2 on the front surface 50a of the lens 50, and is formed as a horizontally long, bright light distribution pattern that spreads with a narrow vertical width from the vicinity of the left side of line V-V to the left substantially along line H-H. The upper edge of the light distribution pattern PB2 forms the upper cut-off line CL2 of the low-beam light distribution pattern PL. At this point in time, the light distribution pattern PB2 is formed in such a manner that the right end of the light distribution pattern PB2 is smoothly connected to the light distribution pattern PA3, overlapping with the light distribution pattern PA3.

As in the case of the light distribution pattern PA2, such a light distribution pattern PB2 is formed because the viewing angle of a light-emitting surface 42a of the light-emitting element 42 from the outer peripheral edge of the total reflection control portion 50bB is extremely small and therefore the light distribution pattern formed by the light emitted from the output region 50aB2 located forward of the outer peripheral edge of the total reflection control portion 50bB is likely to be small and bright.

The light distribution pattern PB3 is a light distribution pattern formed by light emitted from the output region 50aB3 on the front surface 50a of the lens 50, and is formed as a light distribution pattern having the same shape as the light distribution pattern PA3. The light distribution pattern PB3 is superimposed on the light distribution pattern PA3. Therefore, the upper edge of the light distribution pattern PB3 forms the inclined portion CL3 and the right end of the upper cut-off line CL2 more clearly, and a sufficient level of brightness of the high luminous intensity region HZ is secured.

The light distribution pattern PB4 is a light distribution pattern formed by light emitted from the output region 50aB4 on the front surface 50a of the lens 50, and is formed as a horizontally long, relatively bright light distribution pattern that spreads from the vicinity of the left side of line V-V to the left with a relatively narrow vertical width in such a manner as to straddle the light distribution pattern PB2 and the light distribution patterns PA1 and PB1. The light distribution pattern PB2 is formed to enhance the brightness of the high luminous intensity region HZ and secure the brightness of a road shoulder on the own driving lane side.

Figure 8:
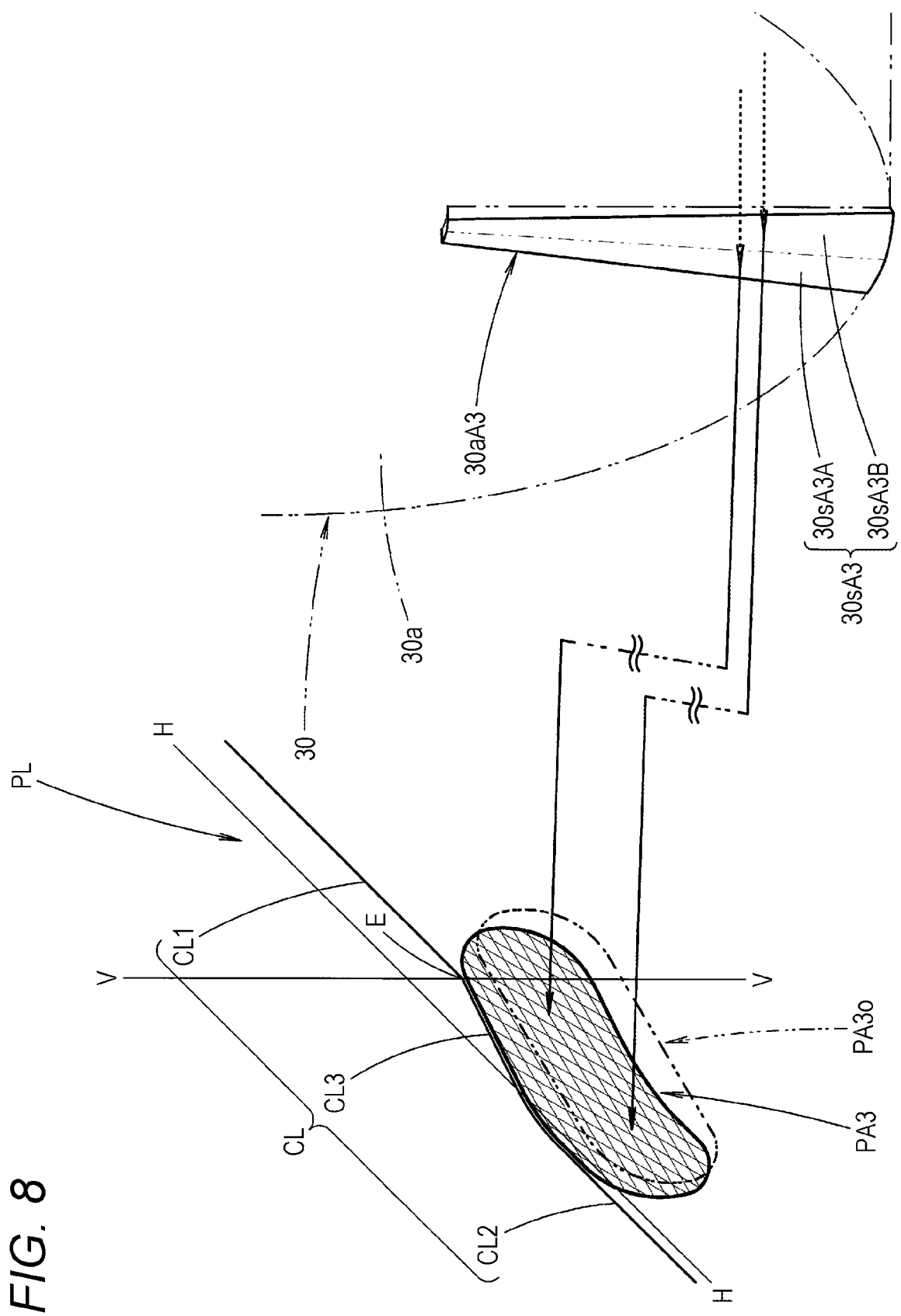
FIG. 8 is a diagram for explaining the process of forming the main elements of the low-beam light distribution pattern.

FIG. 8 is a diagram for explaining the process of forming the light distribution pattern PA3, and illustrates the main elements of the front surface 30a of the lens 30 and the main elements of the low-beam light distribution pattern PL in perspective views.

As illustrated in FIG. 8, the light distribution pattern PA3 formed by light emitted from the specific lens element 30sA3 forming the output region 30aA3 on the front surface 30a of the lens 30 is formed in such a manner that the upper edge of the light distribution pattern PA3 extends from the inclined portion CL3 of the low-beam light distribution pattern PL to the right end of the upper cut-off line CL2 as described above.

On the other hand, a light distribution pattern PA3o indicated by a chain double-dashed line of FIG. 8 is a light distribution pattern that is formed if the specific lens element 30sA3 is not formed in the output region 30aA3, and is formed in such a manner as to extend diagonally upward to the left in the vicinity below the inclined portion CL3. The upper edge of the light distribution pattern PA3o is formed as a clear terminator. This is because the light-emitting element 22 is placed with the lower edge of the light-emitting surface 22a thereof located on the optical axis Ax of the lens 30.

In reality, the specific lens element 30sA3 is formed in the output region 30aA3. Therefore, the light distribution pattern PA3o changes like the light distribution pattern PA3. This is because the specific lens element 30sA3 has a freeform surface in which the curvature of the convex surface changes gradually from the right half part 30sA3A to the left half part 30sA3B, so that the parallel light that reaches the front surface 30a of the lens 30 is deflected slightly upward, and then the output direction is gradually changed from the right half part 30sA3A to the left half part 30sA3B.

Moreover, the output region 30aA3 is formed by the single specific lens element 30sA3, and there is no height difference on the surface of the specific lens element 30sA3. Therefore, a pool of light that causes glare is not accidentally formed in a space above the inclined portion CL3 as the light distribution pattern PA3.

Note that the light distribution pattern PB3 formed by the light projected from the second lamp unit 40 is also formed by the specific lens element 50sB3 forming the output region 50aB3 of the lens 50 as in the light distribution pattern PA3.

Next, the operation of the embodiment is described.

The vehicle lamp 10 according to the embodiment is configured in such a manner as to project the light from the light-emitting elements 22 and 42 of the first and second lamp units 20 and 40 forward through the lenses 30 and 50 in the lamp and accordingly form the low-beam light distribution pattern PL having the Z-shaped cut-off line CL. However, the lenses 30 and 50 are configured in such a manner that parts of the pluralities of lens elements formed on the front surface 30a and 50a are formed as the specific lens elements 30sA3 and 50sB3 having the freeform surface shape, and that the light emitted from the specific lens element 30sA3 and light emitted from the specific lens element 50sB3 form a part of the Z-shaped cut-off line CL. As a result, the degree of flexibility in forming the Z-shaped cut-off line CL can be increased.

As described above, according to the embodiment, the degree of flexibility in forming the Z-shaped cut-off line can CL can be increased in the vehicle lamp 10 configured to project the light from the light-emitting elements 22 and 42 forward through the lenses 30 and 50 in the lamp and then form the low-beam light distribution pattern PL having the Z-shaped cut-off line CL.

At this point in time, in the embodiment, the light emitted from the specific lens elements 30sA3 and 50sB3 can easily form the inclined portion CL3 that connects the lower cut-off line CL1 and the upper cut-off line CL2 of the Z-shaped cut-off line CL.

In particular, in the embodiment, it is configured in such a manner that the light emitted from the specific lens elements 30sA3 and 50sB3 forms a part (that is, the right end) of the upper cut-off line CL2, together with the inclined portion CL3 of the Z-shaped cut-off line CL. Therefore, it is possible to form the Z-shaped cut-off line CL in which the inclined portion CL3 and the upper cut-off line CL2 are smoothly connected together.

In addition, the light-emitting elements 22 and 42 of the first and second lamp units 20 and 40 are placed in such a manner that the lower edges of the light-emitting surfaces 22a and 42a of the light-emitting elements 22 and 42 are aligned with the centers of the lenses 30 and 50 (that is, located on the optical axis Ax), and the specific lens elements 30sA3 and 50sB3 have a vertically long outer shape that spreads downward in a fan form in the lower regions of the lenses 30 and 50. Therefore, the light distribution patterns PA3 and PB3 formed by the light emitted from the specific lens elements 30sA3 and 50sB3 can be clearly formed in a shape suitable for the formation of the inclined portion CL3 of the Z-shaped cut-off line CL and a part of the upper cut-off line CL2.

At this point in time, there is no height difference on the surfaces of the specific lens elements 30sA3 and 50sB3. Therefore, it is possible to avoid accidental formation of a pool of light that causes glare in the space above the inclined portion CL3 as the light distribution patterns PA3 and PB3.

Furthermore, in the embodiment, it is configured in such a manner that light emitted from the lens elements 30sA2 located in the outer peripheral edge region of the front surface 30a of the lens 30 of the first lamp unit 20 forms the lower cut-off line CL1 of the Z-shaped cut-off line CL, and also light emitted from the lens elements 50sB2 located in the outer peripheral edge region of the front surface 50a of the lens 50 of the second lamp unit 40 forms the upper cut-off line CL2 of the Z-shaped cut-off line CL. Therefore, the following operations and effects can be obtained.

In other words, in the lenses 30 and 50 of the first and second lamp units 20 and 40, the light that is let in from the outer peripheral edge regions of the back surfaces 30b and 50b is emitted from the outer peripheral edge regions of the front surfaces 30a and 50a. However, the light-emitting surfaces 22a and 42a of the light-emitting elements 22 and 42 face forward in the lamp. Therefore, the viewing angles of the light-emitting surfaces 22a and 42a from the back surfaces 30b and 50b of the lenses 30 and 50 are small in the outer peripheral edge regions of the lenses 30 and 50. Hence, the light distribution patterns PA2 and PB2 formed by the light emitted from the lens elements 30sA2 and 50sB2 located in the outer peripheral edge regions of the front surfaces 30a and 50a of the lenses 30 and 50 are small and bright. Therefore, the light distribution pattern PA2 forms the lower cut-off line CL1, and also the light distribution pattern PB2 forms the upper cut-off line CL2, which allows the lower cut-off line CL1 and the upper cut-off line CL2 to be formed more clearly.

In the above embodiment, it has been described, assuming that the light-emitting surface 22a of the light-emitting element 22 has the outer shape of approximately 1×1 mm. However, it is also possible to use a light-emitting element having a light-emitting surface of a shape other than the above shape.

In the above embodiment, it has been described, assuming that the light distribution pattern PA3 formed by the light projected from the first lamp unit 20 and the light distribution pattern PB3 formed by the light projected from the second lamp unit 40 are formed in the same shape. However, it is also possible to form the light distribution patterns PA3 and PB3 in different shapes by making the shapes of the freeform surfaces forming the surfaces of the specific lens elements 30sA3 and 50sB3 different from each other.

In the above embodiment, it has been described, assuming that the pluralities of lens elements 30sA2 and 50sB2 formed on the front surfaces 30a and 50a of the lenses 30 and 50 have a relatively simple convex surface. However, it is also possible to form these lens elements as specific lens elements having a freeform surface shape. The adoption of such a configuration allows further increasing the sharpness of the lower cut-off line CL1 and the upper cut-off line CL2.

In the above embodiment, it has been described, assuming that the light projected from the vehicle lamp 10 forms the low-beam light distribution pattern PL of the left light distribution having the Z-shaped cut-off line CL. However, it is also possible to have a configuration in which a light distribution pattern other than the low-beam light distribution pattern PL is formed as long as the light distribution pattern has a cut-off line.

Next, modifications of the above embodiment are described.

Firstly, a first modification of the above embodiment is described.

Figure 5:
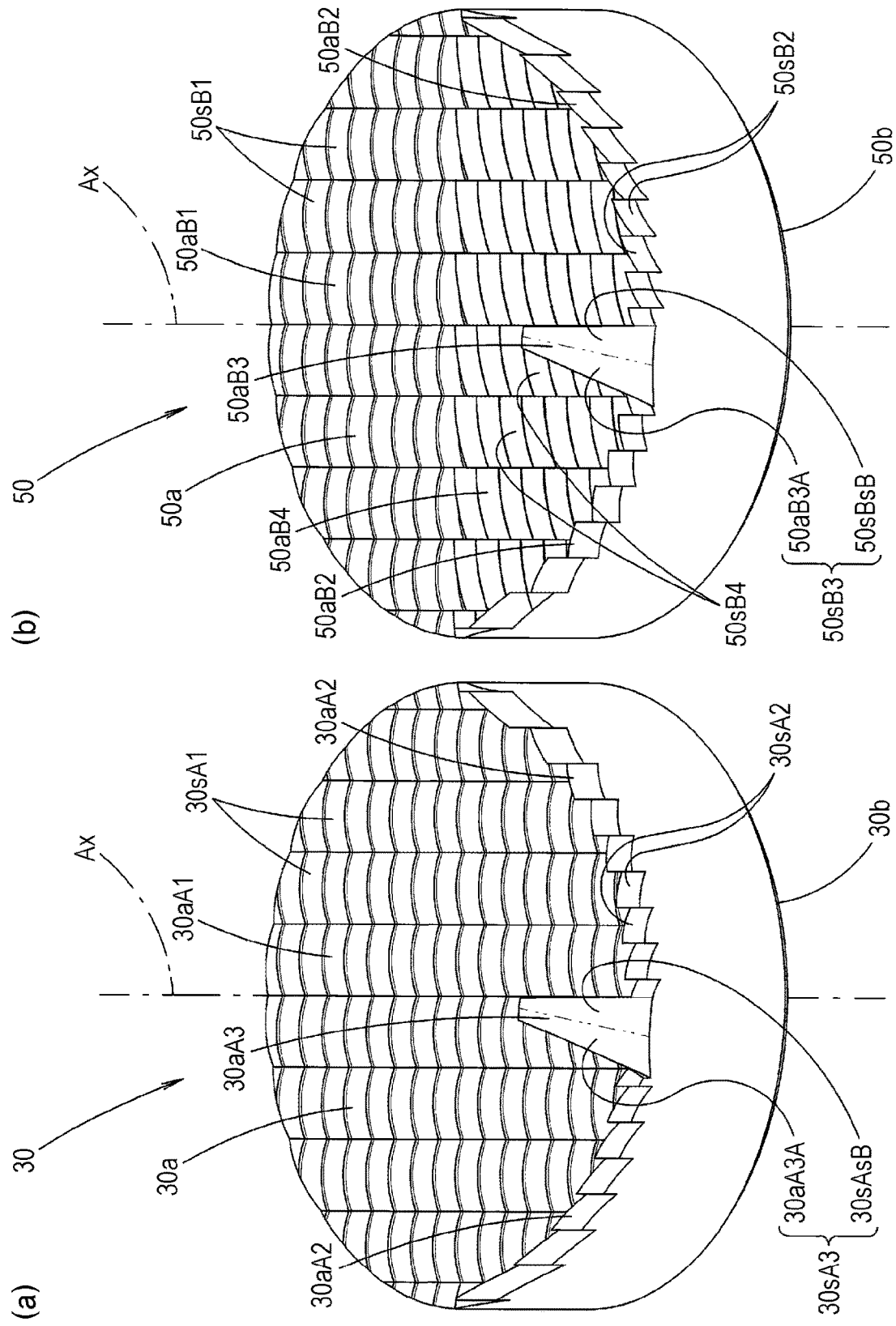
FIG. 5(a) is a perspective view illustrating a lens of the first lamp unit as viewed in a direction of arrow Va of FIG. 4(a)
FIG. 5(b) is a perspective view illustrating a lens of the second lamp unit as viewed in a direction of arrow Vb of FIG. 4(b)
Figure 6:
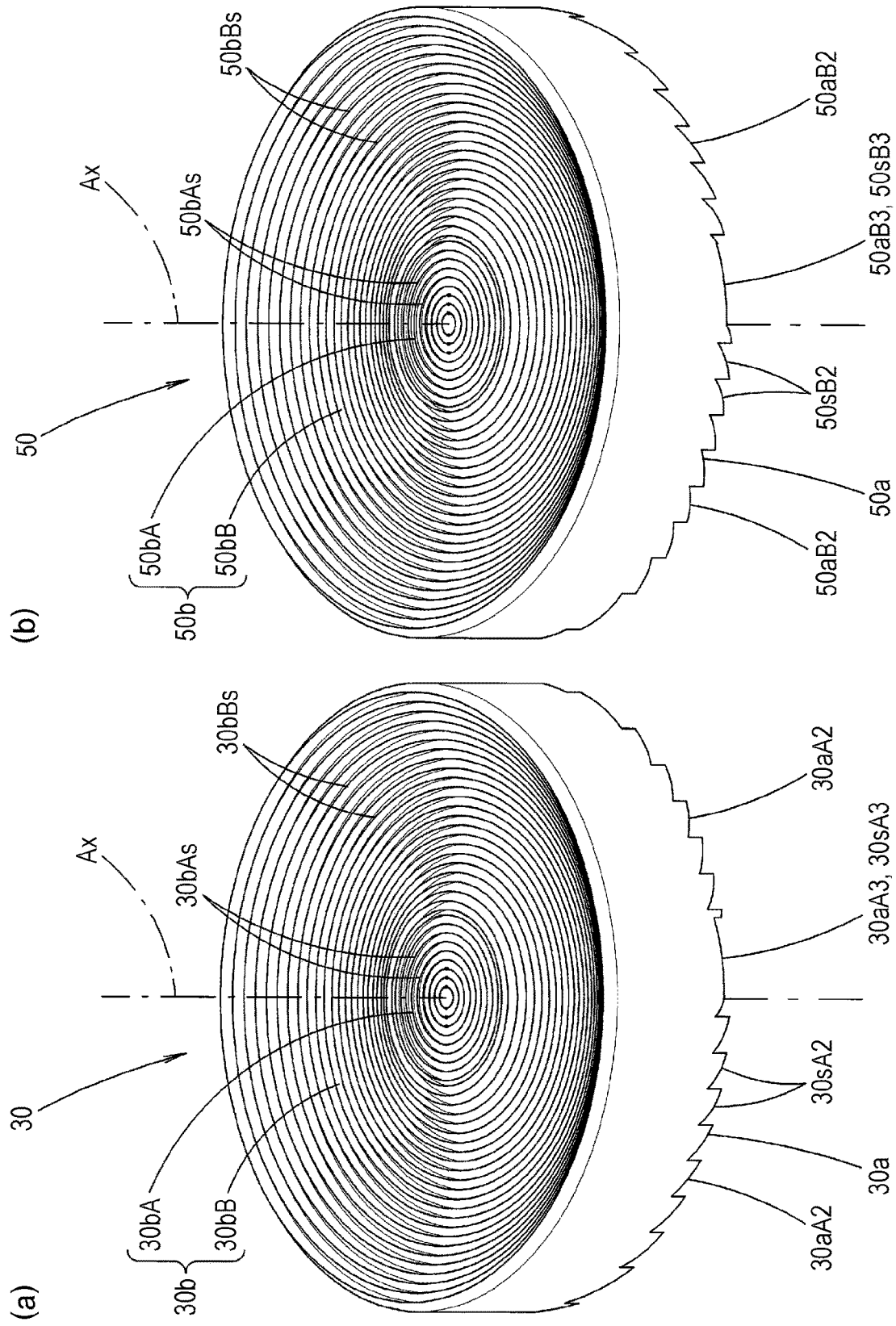
FIG. 6(a) is a perspective view illustrating the lens of the first lamp unit as viewed in a direction of arrow VIa of FIG. 4(a)
FIG. 6(b) is a perspective view illustrating the lens of the second lamp unit as viewed in a direction of arrow VIb of FIG. 4(b)
Figure 9:
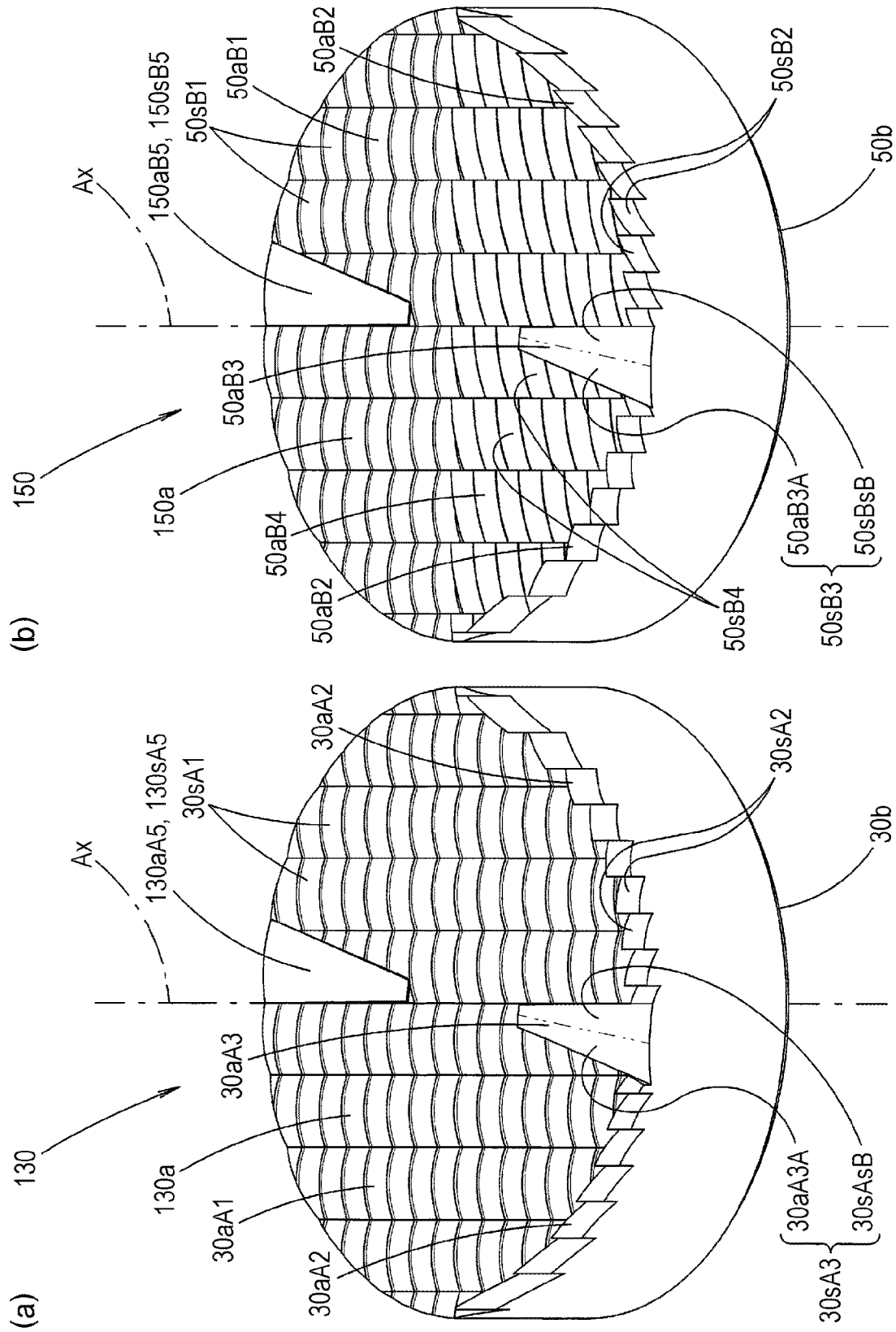
FIG. 9 is diagrams similar to FIG. 5, illustrating a first modification of the embodiment.

FIG. 9 is diagrams similar to FIG. 5, illustrating lenses 130 and 150 of a first and a second lamp unit according to the modification.

As illustrated in FIG. 9, the basic configurations of the lenses 130 and 150 of the modification are also similar to those of the above embodiment. However, the configurations of front surfaces 130a and 150a of the lenses 130 and 150 are partly different from those of the above embodiment.

In other words, the lenses 130 and 150 of the modification are configured in such a manner as to newly provide output regions 130aA5 and 150aB5 on the front surfaces 130a and 150a of the lenses 130 and 150.

The output regions 130aA5 and 150aB5 are regions having a vertically long outer shape that spreads upward in a fan form in the upper regions of the front surfaces 130a and 150a, and are formed in a positional relationship that faces the output regions 30aA3 and 50aB3 across the optical axis Ax.

The output regions 130aA5 and 150aB5 each include a single specific lens element 130sA5 or 150sB5 having a freeform surface shape of a convex surface, and are configured to deflect the light from the light-emitting elements 22 and 42 (not illustrated) that reaches as parallel light from the back surfaces 30b and 50b of the lenses 130 and 150 slightly downward and emit the light in different directions from each other depending on the portions.

Figure 10:
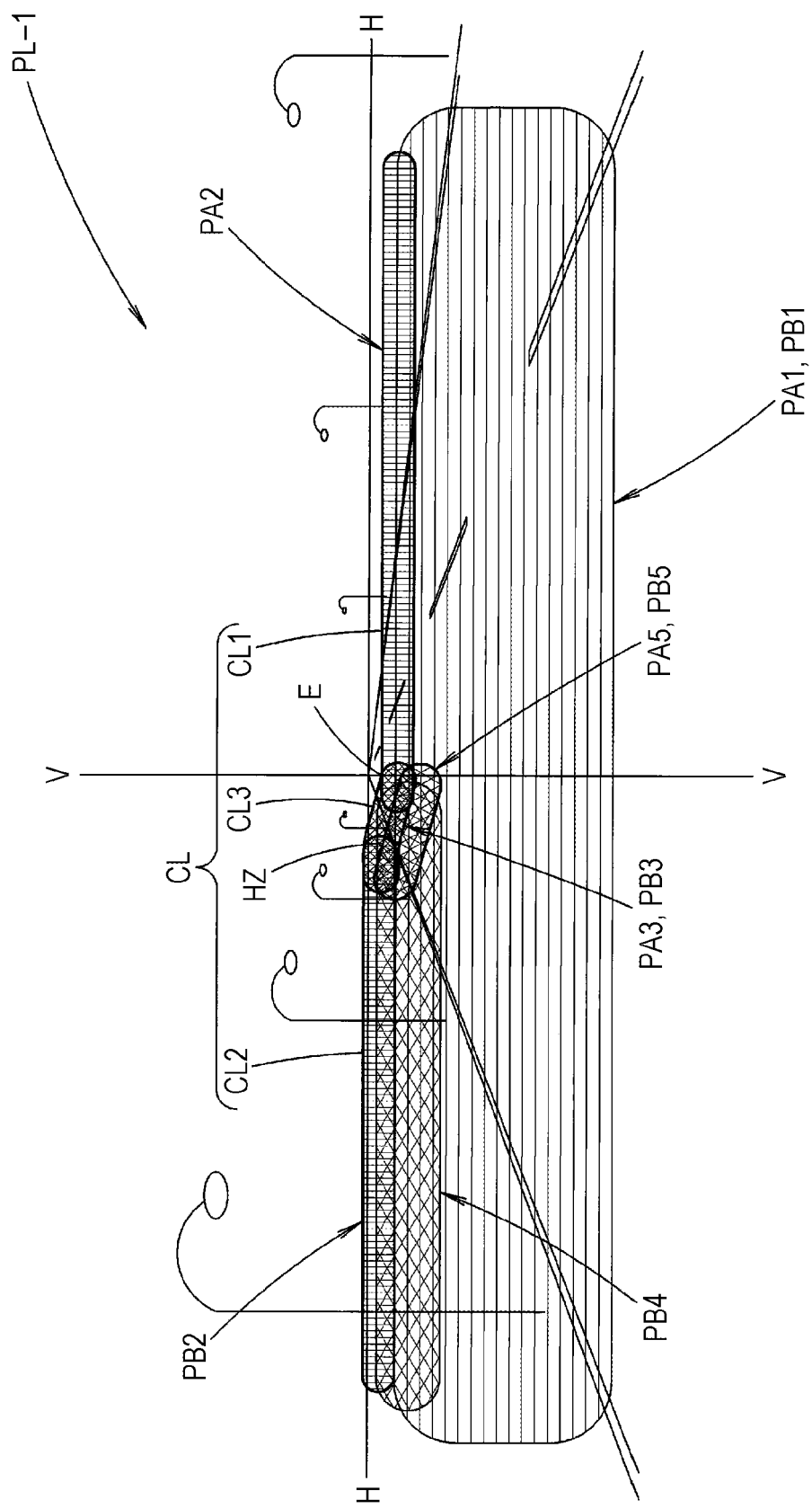
FIG. 10 is a diagram similar to FIG. 7, illustrating the operation of the first modification

FIG. 10 is a diagram perspectively illustrating a low-beam light distribution pattern PL-1 formed on the above virtual vertical screen by light projected from a vehicle lamp according to the modification.

The basic shape of the low-beam light distribution pattern PL-1 is similar to that of the low-beam light distribution pattern PL of the above embodiment. However, the low-beam light distribution pattern PL-1 is different from the low-beam light distribution pattern PL of the above embodiment in that new light distribution patterns PA5 and PB5 are formed near the left side of the elbow point E.

The light distribution patterns PA5 and PB5 are formed as light distribution patterns that are slightly lower in brightness than the light distribution patterns PA3 and PB3 but are slightly larger than the light distribution patterns PA3 and PB3 in such a manner as to partially overlap with the lower ends of the light distribution patterns PA3 and PB3.

In the modification, the light distribution patterns PA5 and PB5 are additionally formed in the low-beam light distribution pattern PL-1. As a result, the high luminous intensity region HZ is brighter than that of the above embodiment.

However, the output regions 130aA5 and 150aB5 are newly provided. Therefore, the areas of the output regions 30aA1 and 50aB1 have decreased by the areas of the new output regions. As a result, the light distribution patterns PA1 and PB1 that form a wide diffusion region are lower in brightness than those of the above embodiment.

Note that such a clear terminator as the one of the light distribution patterns PA3 and PB3 is not formed by the light distribution patterns PA5 and PB5. Therefore, unevenness in light distribution does not occur in the portion of the high luminous intensity region HZ.

The adoption of the configuration of the modification allows the low-beam light distribution pattern PL-1 to provide excellent visibility on a driving road in the distance ahead of the vehicle.

Note that the output regions 130aA5 and 150aB5 are formed by the single specific lens elements 130sA5 and 150sB5 having a freeform surface shape. Therefore, it is possible to easily adjust the size and shape of the high luminous intensity region HZ by changing their surface shape as appropriate.

Next, a second modification of the above embodiment is described.

Figure 11:
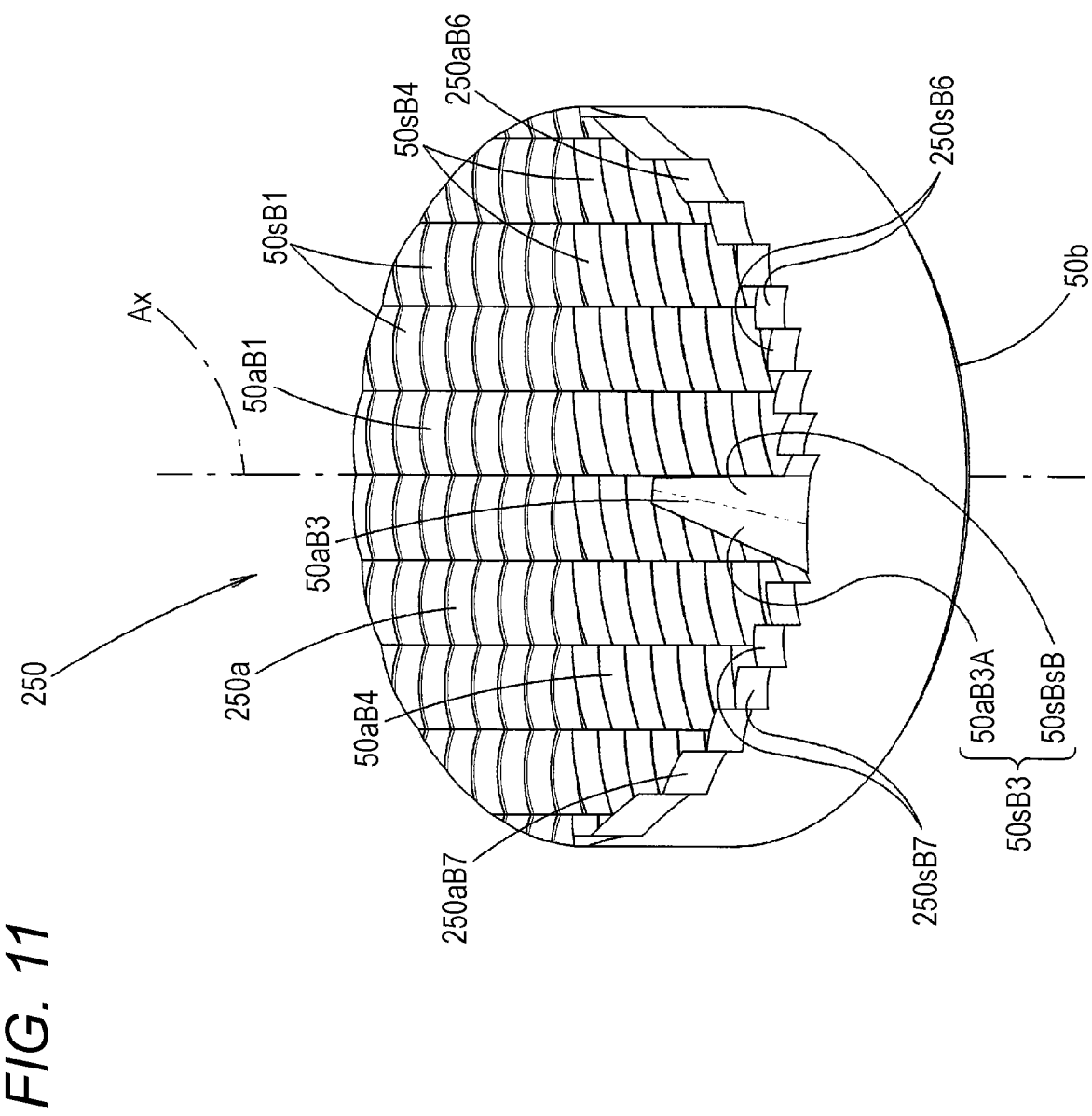
FIG. 11 is a diagram similar to FIG. 5, illustrating a second modification of the embodiment.

FIG. 11 is a diagram similar to FIG. 5, illustrating a lens 250 of a lamp unit according to the modification.

As illustrated in FIG. 11, the basic configuration of the lens 250 of the modification is similar to that of the lens 50 of the second lamp unit 40 in the above embodiment. However, the configuration of a front surface 250a of the lens 250 is partly different from that of the above embodiment.

In other words, the lens 250 of the modification is divided into five output regions 50aB1, 50aB3, 50aB4, 250aB6, and 250aB7.

The configurations of the output regions 50aB1, 50aB3, and 50aB4 are similar to those of the lens 50 of the above embodiment. The configuration of the output region 250aB6 is similar to that of the left half part of the output region 30aA2 of the lens 30 of the above embodiment. The configuration of the output region 250aB7 is similar to that of the right half part of the output region 50aB2 of the lens 50 of the above embodiment. In other words, lens elements 250sB6 similar to the lens elements 30sA2 of the output region 30aA2 are allocated to the output region 250aB6, and lens elements 250sB7 similar to the lens elements 50sB2 of the output region 50aB2 are allocated to the output region 250aB7.

Figure 12:
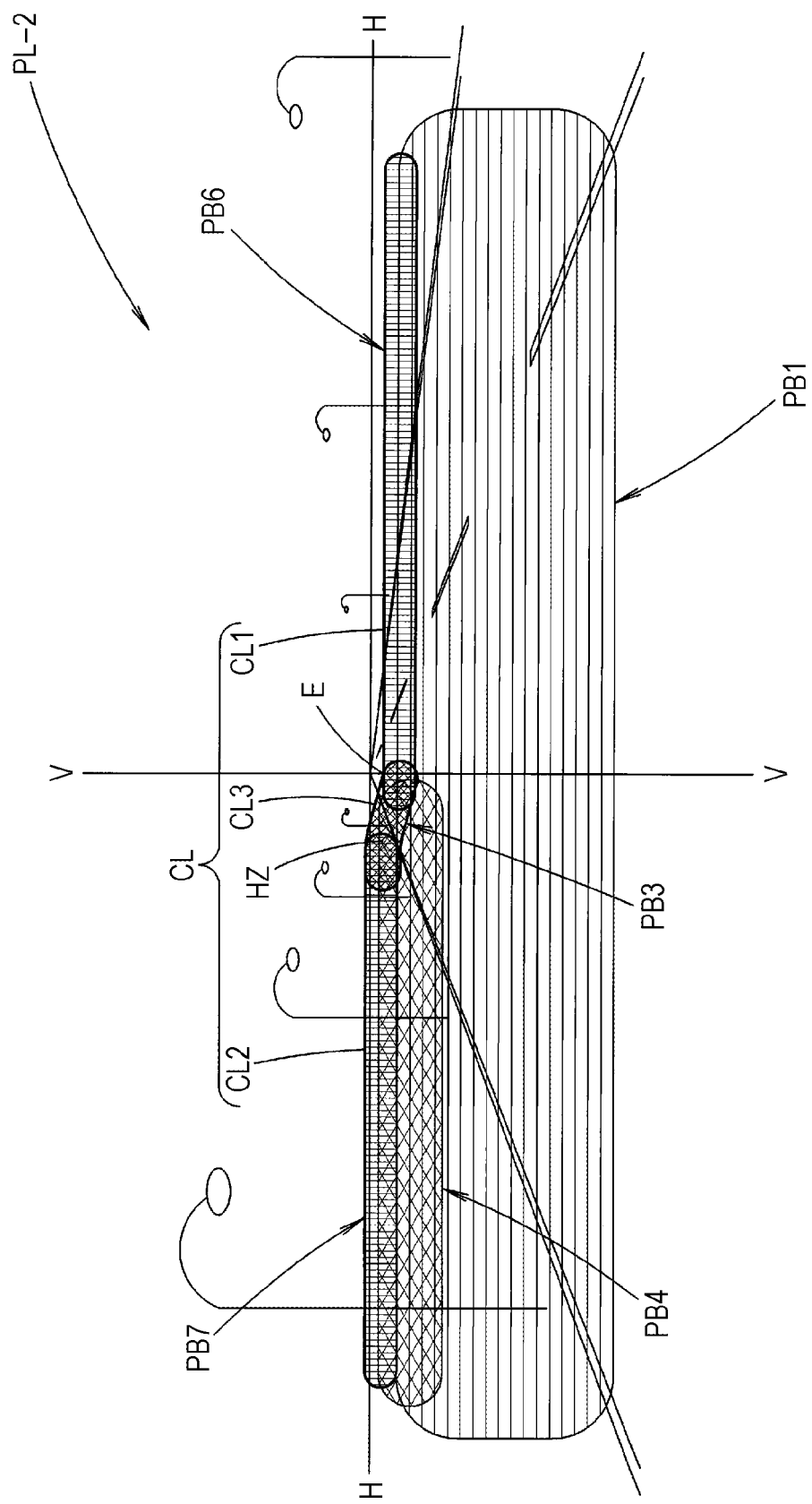
FIG. 12 is a diagram similar to FIG. 7, illustrating the operation of the second modification.

FIG. 12 is a diagram perspectively illustrating a low-beam light distribution pattern PL-2 formed on the above virtual vertical screen by light projected from the vehicle lamp according to the modification.

The basic shape of the low-beam light distribution pattern PL-2 is similar to that of the low-beam light distribution pattern PL of the above embodiment. However, a light distribution pattern PB1 based on light emitted from the output region 50aB1 is formed instead of the light distribution patterns PA1 and PB1 of the above embodiment. A light distribution pattern PB6 based on light emitted from the output region 250aB6 is formed instead of the light distribution pattern PA2 of the above embodiment. A light distribution pattern PB7 based on light emitted from the output region 250aB7 is formed instead of the light distribution pattern PB2 of the above embodiment. A light distribution pattern PB3 based on light emitted from the output region 50aB3 is formed instead of the light distribution patterns PA3 and PB3 of the above embodiment.

The adoption of the configuration of the modification allows light projected from the single lamp unit to form the low-beam light distribution pattern PL-2 having a luminous intensity distribution substantially similar to the low-beam light distribution pattern PL of the above embodiment.

However, the level of brightness of the low-beam light distribution pattern PL-2 is approximately half the level of brightness of the low-beam light distribution pattern PL of the above embodiment. Therefore, it is desirable to use a light-emitting element brighter than the light-emitting element 42 of the above embodiment as a light source for the low-beam light distribution pattern PL-2.

Note that the numerical values indicated as the specifications in the above embodiment and the modifications thereof are merely examples, and naturally the numerical values may be set at different values as appropriate.

Moreover, the invention of the present application is not limited to the configurations described in the above embodiment and the modifications thereof, and it is possible to adopt a configuration to which various modifications are added other than the configurations described above.

The present international application claims priority based on Japanese Patent Application No. 2021-039234, which is a Japanese patent application filed on Mar. 11, 2021, the entire contents of which are incorporated herein by reference.

The above description of the specific embodiment of the present invention has been presented for the purpose of illustration. They are not intended to be exhaustive or to limit the present invention as they are in the forms described. It is obvious to those skilled in the art that many modifications and alterations can be made in light of the above description.

LIST OF REFERENCE SIGNS

10 Vehicle lamp
12 Lamp body
14 Translucent cover
20 First lamp unit
22, 42 Light-emitting element
22a, 42a Light-emitting surface
24 Board
30, 50, 130, 150, 250 Lens
30a, 50a, 130a, 150a, 250a Front surface
30aA1, 30aA2, 30aA3, 50aB1, 50aB2, 50aB3, 50aB4, 130aA5, 150aB5, 250aB6,
250aB7 Output region
30b, 50b Back surface
30bA, 50bA Refraction control portion
30bAs, 50bAs Lens element
30bB, 50bB Total reflection control portion
30bBs, 50bBs Total reflection prism element
30sA1, 30sA2, 50sB1, 50sB2, 50aB4, 250sB6, 250sB7 Lens element
30sA3, 50sB3, 130sA5, 150sB5 Specific lens element 30sA3A, 50sB3A Right half part
30sA3B, 50sB3B Left half part
40 Second lamp unit
Ax Optical axis
CL Z-shaped cut-off line
CL1 Lower cut-off line
CL2 Upper cut-off line
CL3 Inclined portion
E Elbow point
HZ High luminous intensity region
PA1, PA2, PA3, PA5, PB1, PB2, PB3, PB4, PB5, PB6, PB7 Light distribution pattern
PL, PL-1, PL-2 Low-beam light distribution pattern

The invention claimed is:

1. A vehicle lamp comprising: a light-emitting element; and a lens, the vehicle lamp being configured to project light from the light-emitting element forward through the lens in the lamp and form a light distribution pattern including a cut-off line, wherein
the light-emitting element is placed with a light-emitting surface thereof facing forward in the lamp,
on a back surface of the lens, a total reflection control portion is formed to let in the light emitted from the light-emitting element and then totally reflect the light forward in the lamp,
on a front surface of the lens, a plurality of lens elements is formed to control emission of the light reaching from the total reflection control portion,
at least a part of the plurality of lens elements is formed as a specific lens element having a freeform surface shape,
the lens is configured to form a part of the cut-off line with light emitted from the specific lens element,
the vehicle lamp is configured to form, as the light distribution pattern, a low-beam light distribution pattern including a Z-shaped cut-off line in which a lower cut-off line and an upper cut-off line extending in a horizontal direction at different heights on left and right sides are connected via an inclined portion, and
the lens is configured to form the inclined portion with the light emitted from the specific lens element.

2. The vehicle lamp according to claim 1, wherein
the lens is configured to form the part of the upper cut-off line, together with the inclined portion, with the light emitted from the specific lens element.

3. The vehicle lamp according to claim 1, wherein
the light-emitting element is placed in such a manner that a lower edge of the light-emitting surface is aligned with a center of the lens, and
the specific lens element has a vertically long outer shape spreading downward in a fan form in a lower region of the lens.

4. The vehicle lamp according to claim 1, wherein
the lens is configured to form the upper cut-off line and/or the lower cut-off line with light emitted from a lens element located in an outer peripheral edge region of the lens among the plurality of lens elements.

* * * * *